United States Patent [19]

Lin

[11] Patent Number: 5,529,146
[45] Date of Patent: Jun. 25, 1996

[54] OIL APPLYING DEVICE FOR A MACHINE

[76] Inventor: Shu-Sen Lin, No. 12-2, Gin Jong Lane, Guin Gong Road, Taichung, Taiwan

[21] Appl. No.: 523,397

[22] Filed: Sep. 5, 1995

[51] Int. Cl.$^6$ ..................................................... F01M 1/00
[52] U.S. Cl. .................................. 184/13.1; 184/6; 184/67; 184/101; 184/65; 184/81; 492/60
[58] Field of Search ........................... 184/6, 11.1, 13.1, 184/65, 67, 81, 101; 492/46, 60

[56] References Cited

U.S. PATENT DOCUMENTS

| | | | |
|---|---|---|---|
| 1,320,725 | 11/1919 | Zenner | 184/101 |
| 1,899,472 | 2/1933 | Miller et al. | 184/6 |
| 2,566,679 | 9/1951 | Sendzimir et al. | 184/6 |
| 3,150,548 | 9/1964 | Roberts | 184/6 |
| 4,033,289 | 7/1977 | Taylor et al. | 184/65 |
| 5,227,853 | 7/1993 | Proulx et al. | 492/46 |

FOREIGN PATENT DOCUMENTS 1255801  9/1986  U.S.S.R. ............................... 184/101

Primary Examiner—Thomas E. Denion
Attorney, Agent, or Firm—Charles E. Baxley

[57] ABSTRACT

An oil applying device includes a housing having a base for receiving oil and includes an upper oil tank. A lower roller is rotatably supported in the base and a middle roller is rotatably supported above the lower roller such that the lower roller may apply the oil onto the middle roller. An upper roller is rotatably supported above the middle roller for engaging with a work piece between the upper roller and the middle roller. A number of nozzles are secured to the bottom of the oil tank for applying the oil onto the upper roller so as to apply the oil onto the work piece.

5 Claims, 3 Drawing Sheets

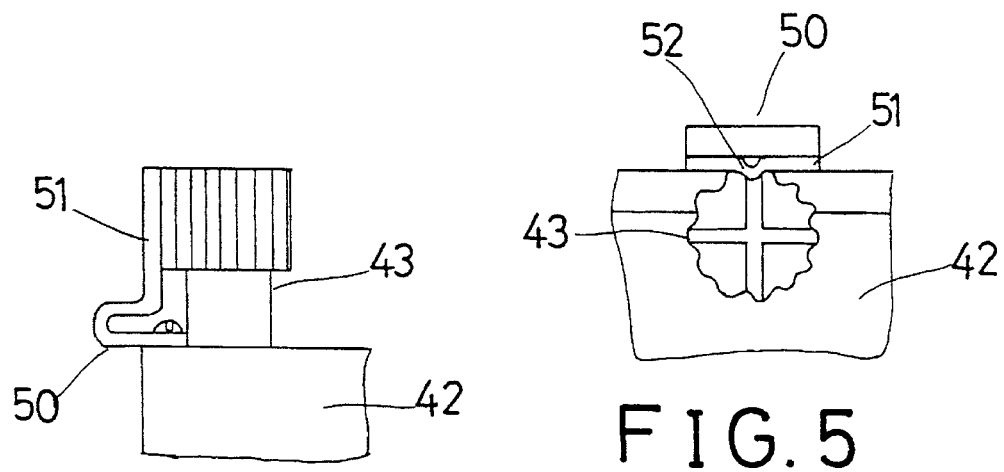
FIG. 4
FIG. 5
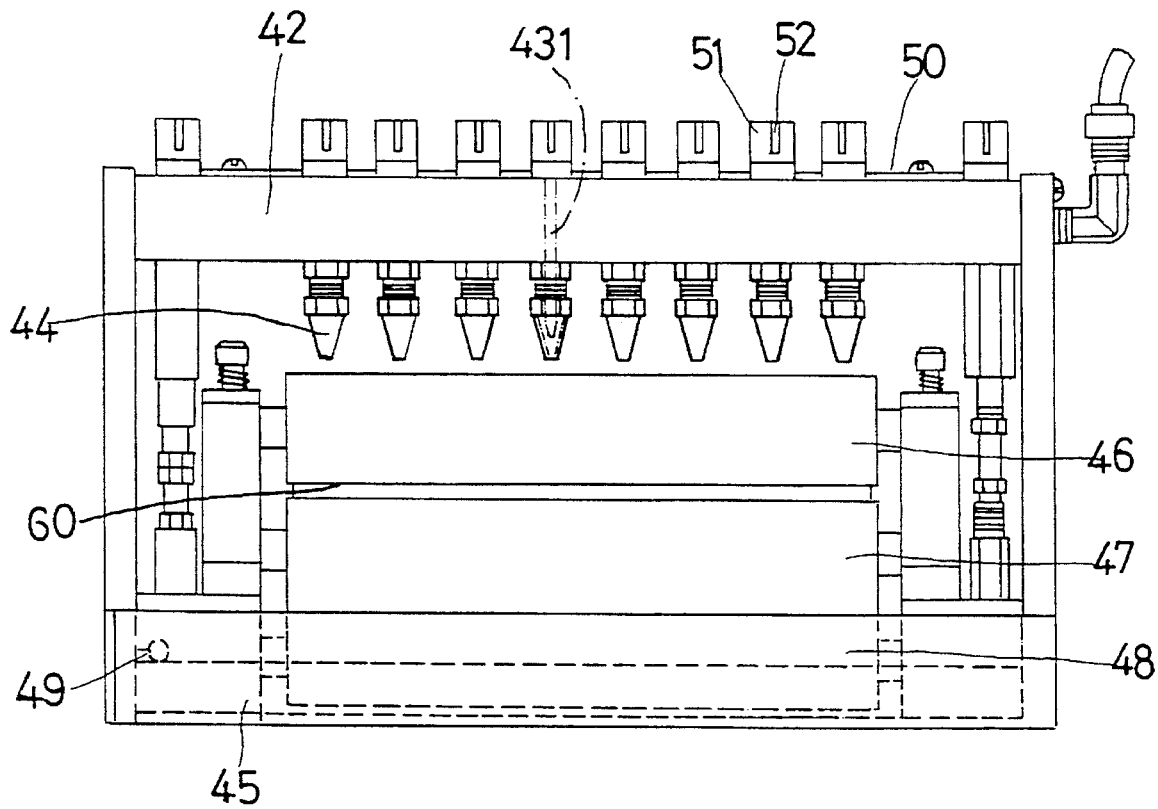
FIG. 3

OIL APPLYING DEVICE FOR A MACHINE

BACKGROUND OF THE INVENTION

1. Field of the Invention

The present invention relates to a applying device, and more particularly to an oil applying device for a machine.

2. Description of the Prior Art

Typical machines, including press machine, forge machine or punch machine, include a forging hammer for acting on the work pieces such that the work pieces may generate heat. In order to dissipate the heat, lubricating oil is required to be applied onto the work pieces. However, typical oil applying devices may be used for applying the oil to one surface of the work pieces only and may not uniformly apply the oil onto the work pieces.

The present invention has arisen to mitigate and/or obviate the afore-described disadvantages of the conventional oil applying devices.

SUMMARY OF THE INVENTION

The primary objective of the present invention is to provide an oil applying device for uniformly applying oil onto both surfaces of the work pieces.

In accordance with one aspect of the invention, there is provided an oil applying device for a machine comprising a housing including a base for receiving oil therein and including an upper portion having an oil tank secured therein for accommodating oil therein, the oil tank including a bottom portion having a plurality of nozzles secured thereto for allowing outward flow of the oil, a lower roller rotatably supported in the base for engaging with the oil contained in the base, a middle roller rotatably supported in the housing and arranged above the lower roller and engaged with the lower roller so as to allow the lower roller to apply the oil onto the middle roller, and an upper roller rotatably supported in the housing and arranged above the middle roller for engaging with and for feeding a work piece between the upper roller and the middle roller, the upper roller being arranged below the nozzles for receiving oil from the nozzles. The upper roller is arranged for receiving the oil from the nozzles and the lower roller may apply the oil onto the middle roller so as to apply the oil onto the work piece.

The oil tank includes a plurality of adjusting knobs provided thereon and for engaging with the nozzles so as to adjusting outward flow of the oil.

The oil tank includes a plurality of resilient blades extended therefrom for engaging with the adjusting knobs so as to position the adjusting knobs in place.

An oil container is further provided for supplying oil to the oil tank and to the base. The oil container includes two bottles and two hoses coupled to the bottles respectively, a valve coupled to the hoses, and a tube coupling the valve to the oil tank, the valve controls the hoses for allowing oil contained in the bottles to flow into the tube.

Further objectives and advantages of the present invention will become apparent from a careful reading of a detailed description provided hereinbelow, with appropriate reference to accompanying drawings.

BRIEF DESCRIPTION OF THE DRAWINGS

FIG. 3 is a front view of an oil applying device;

FIG. 4 is a partial side view of an adjusting device; and

FIG. 5 is a partial top view of the adjusting device as shown in FIG. 4.

DETAILED DESCRIPTION OF THE PREFERRED EMBODIMENT

Figure 1:
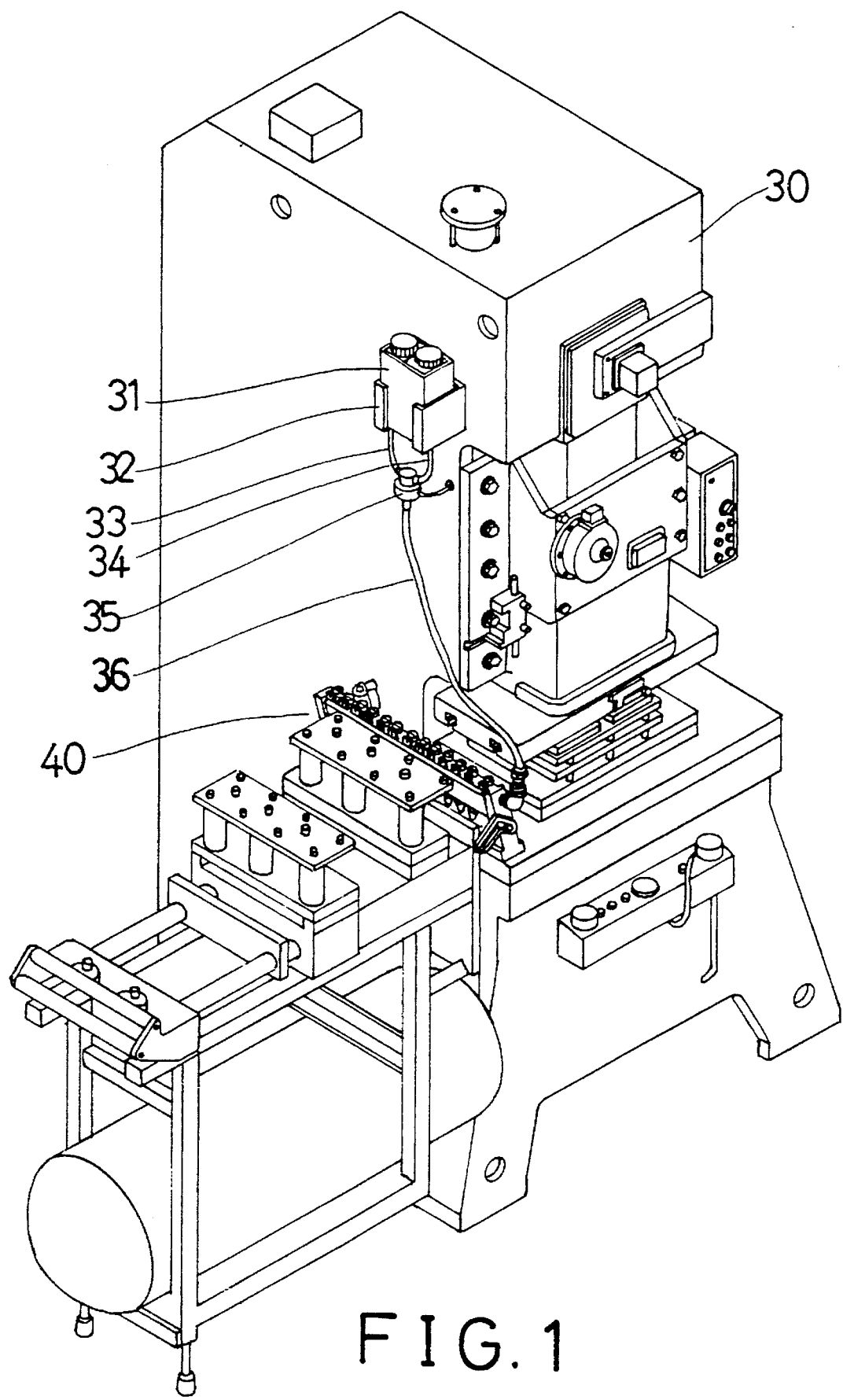
FIG. 1 is a perspective view of a machine having an oil applying device in accordance with the present invention.

Referring to the drawings, and initially to FIG. 1, an oil applying device in accordance with the present invention is generally designated by the reference numeral 40, as shown in FIG. 1, and comprises an oil container 31 retained in a bracket 32 which is secured to a machine, such as forge machine, punch machine, and press machine etc. The oil container 31 includes two bottles for containing two different oils and includes two hoses 33, 34 coupled to the bottles respectively. The hoses 33, 34 include a lower portion coupled to a valve 35, such as a solenoid valve, which may be used to block either or both of the hoses 33. 34. A tube 36 couples the valve 35 to the oil applying device 40. The valve 35 may be coupled to the machine 30 and may be operated by the machine 30. For example, when the machine 30 is stopped working, the valve 35 may be operated to block the hoses 33, 34 in order to prevent the oil from flowing into the oil applying machine 40.

Figure 2:
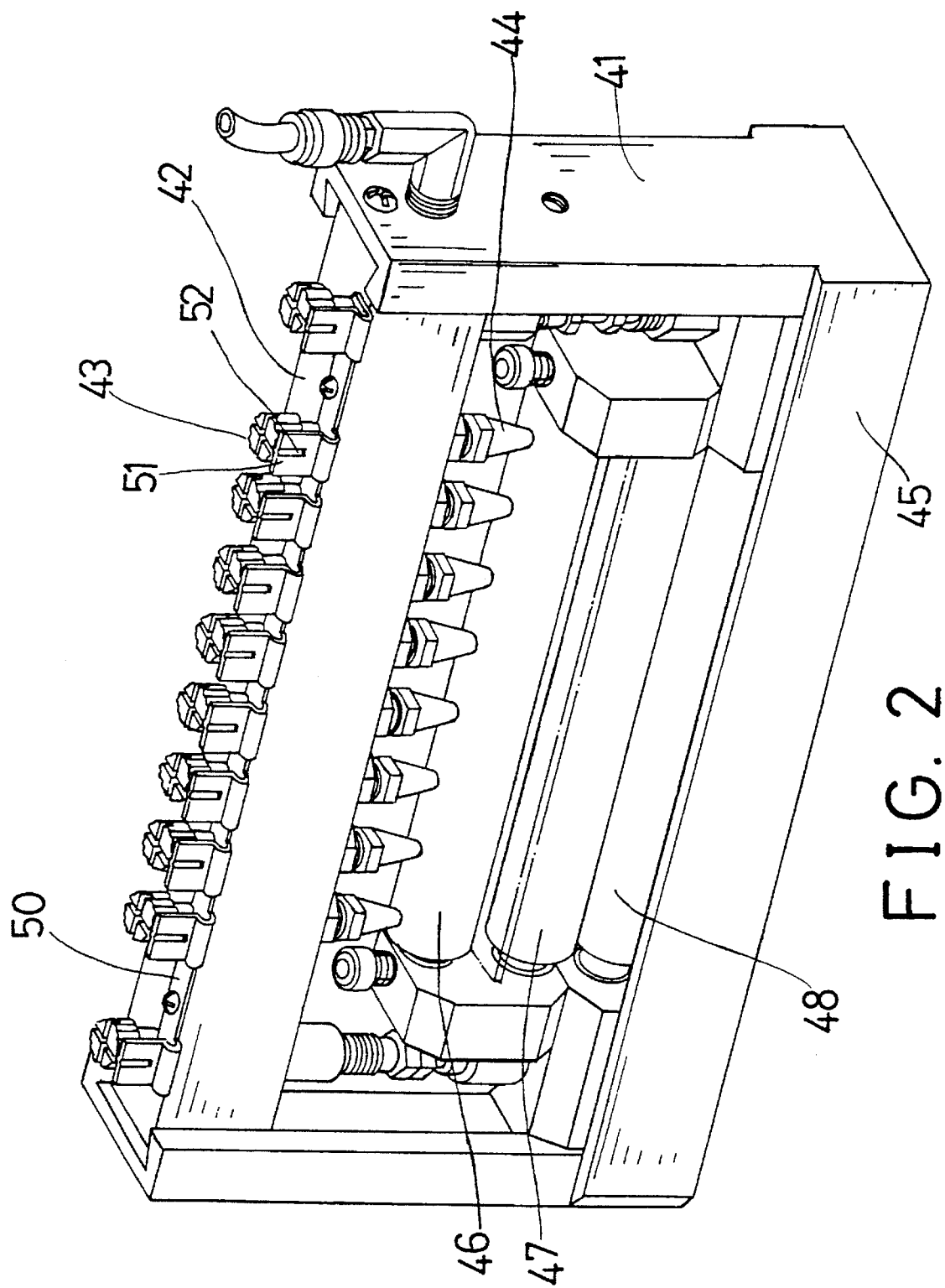
FIG. 2 is a perspective view of an oil applying device.

Referring next to FIGS. 2 and 3, the oil applying machine 40 includes a housing 41 having a base 45 for receiving the lubricating oil therein. A float valve 49 may be provided in the base 45 for sensing the oil level and for actuating an oil pump for supplying oil into the base 45 when the oil is lower than a predetermined level. A lower roller 48 is rotatably supported in the base 45 for engaging with the oil. A middle roller 47 is rotatably supported above the lower roller 48 and engaged with the lower roller 48 such that the lower roller 48 may transmit the oil onto the middle roller 47. An upper roller 46 is rotatably supported above the middle roller 47 such that the work piece 60 may be clamped between and may be fed by the rollers 46, 47. An oil tank 42 is provided on top of the housing 41 and includes a number of nozzles 44 secured to the bottom portion and arranged above the upper roller 46, and includes a number of adjusting knobs 43 provided thereon. The knobs 43 each includes an extension 431 (FIG. 3) for engaging with the nozzles 44 and for adjusting the oil flowing through the nozzles 44 and for adjusting the oil applied onto the upper roller 46.

Referring next to FIGS. 4 and 5, and again to FIG. 2, a strip 50 is secured on top of the oil tank 42 and includes a number of resilient blades 51 extended therefrom. The resilient blades 51 each includes a projection 52 for engaging with the adjusting device 43 so as to retain the adjusting device 43 in place and so as to prevent the adjusting device 43 from being rotated due to the shocks and vibrations of the machine while the machine is operated.

In operation, the oil contained in the oil tank 42 may be applied onto the upper roller 46 via the nozzles 44; and the oil received in the base 45 may be applied onto the middle roller 47 by the lower roller 48 such that the oil may be uniformly applied onto the work piece 60.

Referring again to FIG. 1, the oil container 31 may be stably secured to the machine 30. The solenoid valve 35 may control and allow the required oil into the tube 36 for lubricating purposes. The tube 36 is coupled to the oil tank 42 and to the base 45 for supplying oil into the oil tank 42 and the base 45.

Accordingly, the oil applying device in accordance with the present invention may uniformly apply oil onto the work pieces.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. An oil applying device for a machine comprising:

a housing including a base for receiving oil therein and including an upper portion having an oil tank secured therein for accommodating oil therein, said oil tank including a bottom portion having a plurality of nozzles secured thereto for allowing outward flow of the oil, a lower roller rotatably supported in said base for engaging with the oil contained in said base, a middle roller rotatably supported in said housing and arranged above said lower roller and engaged with said lower roller so as to allow said lower roller to apply the oil onto said middle roller, and an upper roller rotatably supported in said housing and arranged above said middle roller for engaging with and for feeding a work piece between said upper roller and said middle roller, said upper roller being arranged below said nozzles for receiving oil from said nozzles, said upper roller being arranged for receiving the oil from said nozzles and said lower roller applying the oil onto said middle roller so as to apply the oil onto the work piece.

2. An oil applying device according to claim 1, wherein said oil tank includes a plurality of adjusting knobs provided thereon and for engaging with said nozzles so as to adjusting outward flow of the oil.

3. An oil applying device according to claim wherein said oil tank includes a plurality of resilient blades extended therefrom for engaging with said adjusting knobs so as to position said adjusting knobs in place.

4. An oil applying device according to claim further comprising an oil container for supplying oil to said oil tank and to said base.

5. An oil applying device according to claim 4, wherein said oil container includes two bottles and two hoses coupled to said bottles respectively, a valve coupled to said hoses, and a tube coupling said valve to said oil tank, said valve controls said hoses for allowing oil contained in said bottles to flow into said tube.

* * * * *